United States Patent

Dye et al.

[11] Patent Number: 5,969,728
[45] Date of Patent: Oct. 19, 1999

[54] SYSTEM AND METHOD OF SYNCHRONIZING MULTIPLE BUFFERS FOR DISPLAY

[75] Inventors: Thomas A. Dye, Travis County, Tex.; Mike Xudong Cui, Alameda; Bradley A. May, Santa Clara, both of Calif.

[73] Assignee: Cirrus Logic, Inc., Fremont, Calif.

[21] Appl. No.: 08/892,073

[22] Filed: Jul. 14, 1997

[51] Int. Cl.⁶ .................................................. G09G 5/36
[52] U.S. Cl. ..................... 345/515; 345/508; 345/509; 345/514; 345/522
[58] Field of Search ........................... 345/522, 507–509, 345/515, 514; 395/376

[56] References Cited

U.S. PATENT DOCUMENTS

| | | | |
|---|---|---|---|
| 4,876,651 | 10/1989 | Dawson et al. | 345/508 |
| 5,657,478 | 8/1997 | Recker et al. | 345/522 |

*Primary Examiner*—Kee M. Tung
*Assistant Examiner*—Sy D. Luu
*Attorney, Agent, or Firm*—Gary R. Stanford; Steven A. Shaw

[57] ABSTRACT

A graphics system including a frame buffer having two or more buffers, a graphics processor and system memory. The graphics processor includes rendering logic, display logic and a buffer switch memory that stores an address. The display logic reads the address from the buffer switch memory and retrieves rendered data for display from one of the buffers. The rendering logic retrieves a next display list from the system memory after a continue indication is provided, renders the retrieved display list into another buffer, writes an address corresponding to the other buffer into the buffer switch memory and clears the continue indication. The continue indication may be a separate bit or a continue flag provided within each display list. The rendering logic sequences through the plurality of buffers in this manner to render a plurality of display lists. If only two buffers are provided, then the buffer switch memory includes an arm bit and the rendering logic sets the arm bit after rendering each display list. The rendering logic then waits until the arm bit is cleared before retrieving and rendering another display list.

7 Claims, 11 Drawing Sheets

SYSTEM AND METHOD OF SYNCHRONIZING MULTIPLE BUFFERS FOR DISPLAY

FIELD OF THE INVENTION

The present invention relates to a system and method of synchronizing multiple buffers for display, and more particularly to a graphics processor for synchronizing the switching of buffers for purposes of drawing or rendering commands into images and displaying the rendered images.

BACKGROUND OF THE INVENTION

Graphic capabilities are now common in a variety of applications for personal computers, including three-dimensional (3D) games, multimedia communications and computer-aided design applications (CAD), which perform many graphic functions, including 3D animation, sophisticated shading algorithms, transparency and alpha-blending, live video windows, stereo 3D windows, etc. To perform the desired graphic functions, the computer system must be capable of performing more sophisticated functions in less time. This is particularly true for graphics animation. The computer system must be able to draw complicated geographical figures and fill them while performing complicated 2D and 3D functions, such as patterning, depth cueing, color compare, alpha blending, accumulation, texture assisting, anti-aliasing, super-sampling, color masking, stenciling, panning and zooming, as well as depth and color interpolation, among other functions. The computer system must also draw the geographical figures at a much greater speed while manipulating the pixel data being refreshed to the display monitor.

The architecture of the personal computer system has advanced to handle many sophisticated graphic capabilities required by modern software applications. In more complicated architectures and for more sophisticated applications, a separate graphics processor or accelerator was provided to relieve the primary central processing unit (CPU), so that the CPU could perform other functions and operations. In some systems, the CPU executed an application program and generated programs or instructions for execution by a graphics coprocessor. For 3D capabilities, particularly animation, the cooperation between the CPU and the graphics coprocessor became more critical for determining the quality and speed of the animation. In many designs, the cooperation was not entirely efficient, so that the display became jerky or non-uniform, which was noticeable and distracting to the user. For example, the CPU was often used to monitor the operation of the graphics coprocessor via registers or memory addresses or the like, particularly with respect to status of frames being displayed and program portions being rendered in a frame buffer. In particular, the CPU typically polled one or more status registers to determine when one frame was completed to determine when to switch buffers during 3D operations. Such polling consumed valuable CPU time and reduced 3D performance.

It is therefore desirable to provide a graphics system to perform high level graphics functions and to achieve faster graphic data transfer without significantly depreciating the performance of the computer system. It is particularly desirable to provide improved cooperation between the CPU and a graphics coprocessor to improve 3D animation.

SUMMARY OF THE INVENTION

A method of synchronizing a plurality of buffers according to the present invention is used in a graphics system for rendering and displaying a plurality of instruction sets or display lists. A display list is a set of drawing instructions created by a computer processor that are executed or "rendered" by a graphics accelerator or processor for display by a display adapter. Each display list is rendered into a buffer and displayed during one or more display intervals of a plurality of sequential frame intervals, where each frame interval includes a display interval followed by a blank interval. The method includes steps of reading a "next flip" address during each blank interval and displaying a buffer corresponding to the address during the following display interval, alternately writing consecutive display lists into at least two memory locations in a system memory, waiting for a continue indication for a written display list to be cleared before overwriting that display list, providing a continue indication after each display list is written, selecting a next buffer other than the buffer being displayed for rendering a next display list, retrieving and rendering a next written display list into the selected buffer after a continue indication is provided, clearing the continue indication after a display list has been rendered, and repeating the selecting, retrieving and rendering, clearing and writing address steps for each of the plurality of display lists.

The above method enables a graphics system to synchronize the plurality of buffers in a frame buffer to render and display the display lists on a display device, such as a monitor of a computer system. One of the buffers may be used as a Z buffer for 3D rendering and display, where the Z buffer is preferably initialized after a display list is retrieved and rendered. The Z buffer does not need multiple buffering and is typically initialized before rendering. Also, after another buffer is selected, the next buffer is preferably initialized for rendering. If the frame buffer only includes two buffers, a method according to the present invention further includes steps of clearing an arm flag after reading the address during each blank interval, and for each display list, setting the arm flag and waiting for the arm flag to be cleared before retrieving the next display list for rendering.

The next flip address is written into a memory location or "secondary" register at any time and is read by a display controller during each blank interval. Also, the arm bit is preferably set automatically when writing to the address register and cleared automatically when reading from the register. It is possible for this memory location or register to be read and written at approximately the same time, possibly resulting in erroneous data and/or improper status of the arm bit. Therefore, a guardband is preferably implemented to prevent reading and writing the address register. A method according to the present invention may further includes steps of negating a ready signal while reading the address, and writing of the address only while the ready signal is asserted. The guardband prevents a new address from being written while a previous address is being read, thereby preventing erroneous status of the arm bit. The new address is written and the arm bit is subsequently set, which arms for buffer transfer which occurs at the next blank interval.

The display lists are preferably written by a main or central processor, such as a CPU or the like, into memory locations of a system memory. The continue indication may be implemented using one or more bits in the graphics processor. Alternatively, the processor writes a cleared continue flag into each display list and sets the continue flag of the previous display list after writing the next display list. The graphics processor clears the continue flags after rendering the display list to indicate to the processor that the memory location is available for another display list. A method according to the present invention may further include steps of setting a continue bit after writing each display list and waiting for the continue bit to be cleared before writing into a memory location. Alternatively, the method includes steps setting a continue flag within each display list after writing a next display list and waiting for the continue flag of a display list to be cleared before writing over that display list. The continue indications ensures that a display list is rendered by the graphics processor before it is overwritten by the CPU.

A graphics system according to the present invention is used in a computer system that has a system memory for storing display lists. The graphics system includes a frame buffer having two or more buffers and a graphics processor coupled to the frame buffer and the system memory. The graphics processor includes a buffer switch memory that stores an address, rendering logic that retrieves and renders display lists and display logic that displays the rendered display lists. The buffer switch memory may include a continue bit in one embodiment. The display logic reads the address from the buffer switch memory and uses the address to retrieve rendered data for display from one of the buffers. The rendering logic retrieves a next display list from the system memory after the continue bit is set, renders the retrieved display list into another buffer, writes an address corresponding to the other buffer into buffer switch memory and sets the continue bit. The rendering logic sequences through the plurality of buffers in this manner to render a plurality of display lists.

If only two buffers are provided in the frame buffer, then the buffer switch memory includes an arm bit and the rendering logic sets the arm bit after rendering each display list. The rendering logic then waits until the arm bit is cleared before retrieving and rendering another display list. For three or more display buffers, the rendering logic does not have to wait for the display logic to finish displaying a frame and may begin initializing and rendering to a third buffer.

The rendering logic preferably includes a host interface that retrieves display lists from the system memory and a 3D engine that renders the retrieved display lists. The display logic preferably includes a display controller for converting rendered data into video signals for a monitor. The buffer switch memory preferably includes a secondary start register for storing the address and the display logic preferably includes a refresh register, where the display logic copies the address in the start register to the refresh register. For implementing a guardband, the display logic asserts a ready signal, and the rendering logic only writes the address of a rendered buffer when the ready signal is asserted. The display logic negates the ready signal when it reads the address to prevent an asynchronous race between reading and writing the address.

A computer system according to the present invention includes a display device, the frame buffer with the plurality of buffers, the system memory, the graphics processor and a central processor. The system preferably includes a host bus coupled to the central processor and the system memory, a peripheral bus such as a peripheral component interconnect (PCI) bus or the like, and a bus bridge coupled between the host and peripheral buses. The graphics processor is preferably coupled to the peripheral bus. The central processor writes each display list into the system memory and then provides a corresponding continue indication. If one or more continue bits are used, the central processor sets the continue bit after writing each display list and waits for the continue bit to be cleared before overwriting a previously written display list. Alternatively, the central processor writes a continue flag that is initially cleared near the end of each display list. The central processor then sets the continue flag of the last display list after writing a new display list, and waits for the continue flag of a previously written display list to be cleared before writing over that display list. The graphics processor waits for the continue flag to be set before branching to the next display list, and then clears the continue flag after rendering each display list.

The graphics processor typically renders display lists faster than the processor writes them, so that the central processor rarely, if ever, waits on the graphics processor. If the frame buffer includes only two buffers, then the buffer switch memory further includes an arm bit. The rendering logic sets the arm bit after rendering each display list and waits until the arm bit is cleared before retrieving and rendering another display list. The arm bit is cleared after a buffer switch.

It is appreciated that a system and method of synchronizing multiple buffers for display according to the present invention is used by or implemented within a graphics system to perform high level graphics functions and to achieve faster graphic data transfer without significantly depreciating the performance of a computer system. A system and method according to the present invention may be used to provide improved cooperation between a CPU and a graphics coprocessor to improve 3D animation.

BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENTS

Figure 1:
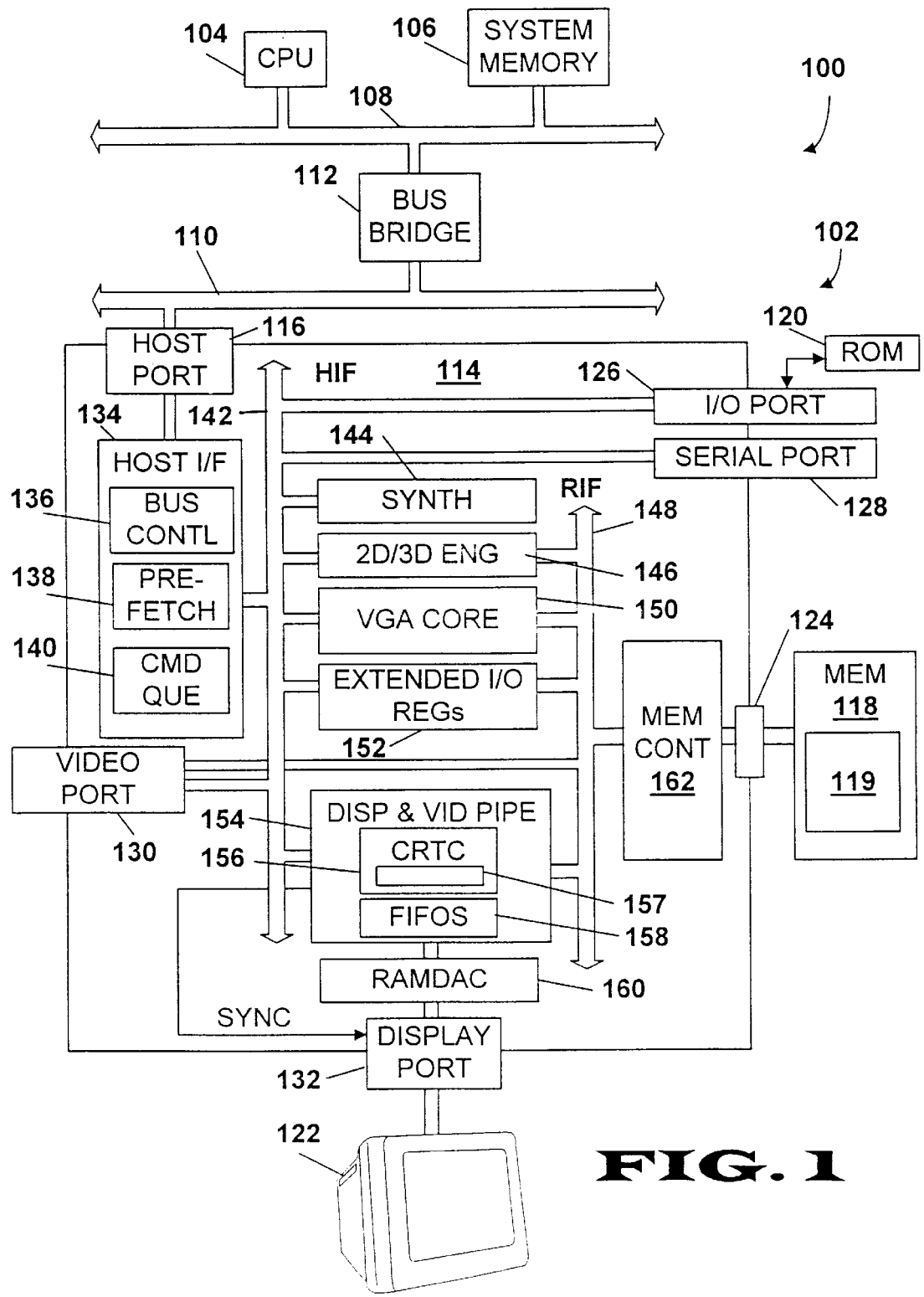
FIG. 1 is a block diagram of a computer system including a graphics system implemented according to the present invention.

Referring now to FIG. 1, a simplified block diagram is shown of a computer system 100 including a graphics system 102 implemented according to the present invention.

The computer system 100 includes a central processing unit (CPU) 104 and system memory 106 coupled to a host bus 108. The host bus 108 is coupled to an input/output (I/O) or peripheral bus 110 across a bus bridge 112. The peripheral bus 110 is implemented according to any one of a plurality of different types of buses, such as the industry standard architecture (ISA), the extended ISA (EISA), the peripheral component interconnect (PCI), the video electronic standard association (VESA) local bus, the L-bus, the VMEbus (Virtual Mode Extension) or any other type of standardized bus used in computer systems. In the preferred embodiment, the peripheral bus 110 is a PCI bus.

The graphics system 102 includes a memory 118, a read only memory (ROM) 120 and a display unit 122 coupled to a graphics processor 114, where the graphics processor is coupled to the peripheral bus 110 via a host port 116. The graphics processor 114 is preferably a graphics accelerator, such as one of the CL-GD546X family of high-performance VisualMedia™ accelerators by Cirrus Logic, Inc. For example, the CL-GD5464 graphics accelerator includes a glueless interface for connecting directly to a PCI bus that is PCI v2.1 compliant, and supports zero wait-state bursts at up to 33 Megahertz (MHz) as a bus slave or bus master. The CL-GD5464 also includes up to two RAMBUS™ channels, industry standard monitor channels and a VESA standard feature connector interface. The CL-GD5464 is software compatible with the IBM VGA standard and register compatible with industry standard VGA. The ROM 120 is preferably a VGA-compatible BIOS with VESA extensions and includes drivers for the many industry-wide GUIs (graphic user interfaces) such as Microsoft® Windows® v3.x, Windows® 95, Microsoft NT, Microsoft DirectDraw™ and IBM® OS/2®. It is understood, however, that the present invention may be implemented into any graphics processor or accelerator and is not limited to any particular device or implementation.

The memory 118 is a separate bank of external random access memory (RAM) devices or the like, such as dynamic RAM (DRAM), synchronous RAM (SRAM), EDO RAM, RDRAM, etc., coupled to the graphics processor 114 via one or more memory channels 124. In the preferred embodiment, the memory 118 includes up to 32 Megabytes (MB) of RDRAM for storing a frame buffer 119 used for drawing and display purposes. The frame buffer 119 includes a description of each pixel on the display unit 122. A rectangular portion of the frame buffer 119 is referred to as the display rectangle, which is "visible" on the display unit 122. The format of the pixel and texel descriptions in the frame buffer 119 is either in palletized, Red, Green and Blue (RGB) or YUV format or any combination of these formats. The memory 118 may also include an off-screen color buffer, Z buffer and texture maps. The frame buffer 119 is further described below.

The ROM 120 is coupled to the graphics processor 114 using an I/O port 126, which may be reused as a general-purpose I/O (GPI/O) port after the contents of the ROM 120 are read and stored in the memory 118. The I/O port 126 has several operating modes, including 8-bit and 16-bit configurations, an ATT AV4400A video coder/decoder (codec) mode, or a C-CUBE CL480 MPEG decoder mode. The graphics processor 114 includes a serial port 128, which is preferably an $I^2C$ serial port. The graphics processor 114 also includes a video port 130 that provides for capture and display of real-time video, such as, for example, an enhanced V-Port™. The display unit 122 is any standard VGA or SVGA monitor or the like and is coupled to the graphics processor 114 via a display port 132.

Within the graphics processor 114, a host interface 134 is coupled to the host port 116 for interfacing the peripheral bus 110. The graphics processor operates according to any one of several different modes as controlled by the CPU 104. The CPU 104 may program the graphics processor 114 directly by loading registers and then writing instructions one at a time via the host interface 134. After the graphics processor 114 completes an instruction, it stops execution and waits for the next instruction. Alternatively, the CPU 104 may operate the graphics processor 114 in a coprocessor indirect programming mode by writing instructions and data at particular memory offsets. The preferred mode of operation of the graphics processor 114, however, is a display list programming mode that allows concurrent operation between the CPU 104 and the graphics processor 114. The CPU 104 builds one or more display lists in the system memory 106 and executes a BRANCH instruction to the graphics processor 114. The graphics processor 114 respondingly switches to display list processor mode and executes one or more of the display lists. The number of display lists executed in a row depends upon the display list instructions. It is noted that although the display lists are preferably written by the CPU 104 into the system memory 106 as described herein, the display lists may alternatively be written or transferred to the memory 118 and rendered therefrom by the graphics processor 114.

Each display list may include any one or any combination of LOAD instructions to set up control registers for drawing, a plurality of drawing commands including DRAW_POINT, DRAW_LINE, DRAW_POLY, etc., and several control and transfer instructions, including one or more BRANCH, RETURN, CLEAR, IDLE, WAIT, NOP (no operation), etc. Instructions. A DRAW instruction includes a draw opcode alone or a draw opcode followed by a sequence of parameters that define the region to be drawn, its color and texture, and other characteristics as desired. The graphics processor 114 continues operation in display list mode autonomously until an IDLE instruction is encountered, at which point the graphics processor 114 stops and waits to be restarted by a BRANCH instruction from the CPU 104. Also, an INT instructions temporarily interrupts display list execution for reporting intermediate progress, where the CPU 104 writes a RET instruction to restart execution. Each display list may include BRANCH instructions to other display lists as well, so that the graphics processor 114 executes as many display lists as desired before stopping.

During normal display list operation, a prefetch unit 138 accesses and pre-decodes instructions and parameters from each display list in the system memory 106 via a bus controller 136 within the host interface 134. The bus controller 136 is preferably PCI compliant for controlling PCI bus master cycles of the bus 110 to fetch instructions from the system memory 106. The instructions and parameters are loaded into a command/read (CMD/RD) queue 140 of the host interface 134 and executed. The CMD/RD queue 140 allows the bus controller 136 to release the bus 110 after each instruction and any of its parameters are loaded to achieve a high degree of parallelism. The CMD/RD queue 140 also includes a read queue to allow reads of texture maps or the like stored in the memory system 106 to be loaded into the host interface 134. Each instruction and its parameters, if any, are transferred to one or more internal blocks within the graphics processor 114, which then execute the indicated instruction.

The host interface 134 is coupled to an internal host interface (HIF) bus 142, which is coupled to the I/O port 126, the serial port 128, the video 130 and to most of the internal blocks of the graphics processor 114. One or more frequency synthesizers 144 are coupled to the HIF bus 142 for controlling the frequency of video, video timing and memory bus clocks. A two-dimensional/three-dimensional (2D/3D) engine 146 is coupled between the HIF bus 142 and an internal memory interface (RIF) bus 148, which is preferably implemented according to the RAMBUS™ standard. The 2D/3D engine 146 receives and executes drawing commands for drawing elements and pixels in the frame buffer 119 of the memory 118. The 2D/3D engine 146 includes decode and execution logic, 3D parameter and control registers, X, Y and Z space and RGB and texture interpolators, X, Y clip and mask and Z compare logic, lighting and alpha blending logic as well as various control logic and memory buffers and First-in, First-out buffers (FIFOs), etc.

A VGA core 150 and an extended I/O block 152 are coupled to the HIF and RIF buses 142, 148. The VGA core 150 includes a VGA sequencer and a plurality of VGA core registers 302 (FIG. 3) that are compatible with the industry-standard IBM VGA adapter, and provides a VGA-compatible access path to the frame buffer 119. The extended I/O block 152 includes registers and logic to expand the graphics capabilities of the graphics processor 114 beyond VGA as further described below. A display and video pipeline 154 is coupled to the HIF and RIF buses 142, 148 and includes a cathode-ray tube controller (CRTC) 156 and one or more FIFOs 154 for transferring display data to a random-access memory digital-to-analog converter (RAMDAC) 160. The RAMDAC 160 includes a plurality of palette DACs and RAM buffers (not shown) and generally maps data from the memory 118 to RGB format. In general, the RAMDAC 160 receives digital data stored in a frame buffer 119 in the memory 118 and converts the digital data to the appropriate analog outputs required to drive the display unit 122. The video output signals are provided to the display unit 122 via the display port 132, which also receives synchronization signals (SYNC) from the display and video pipeline 154.

The CRTC 156 generates the synchronization video timing signals (SYNC), including a horizontal synchronization (HSYNC) signal, a vertical synchronization (VSYNC) signal and a screen blanking (VBLANK*) signal. An asterisk (*) appended to the end of a signal name denotes negative logic, where the signal is considered asserted when low and not asserted when high. The CRTC 156 also generates display refresh requests to the frame buffer 119. The CRTC 156 includes a display refresh buffer or register 157 that stores a start address within the frame buffer 119 for display on the display unit 122. The address in the display refresh register 157 is loaded into the display counters prior to each display interval, during which time a single frame is drawn on the display unit 122. The display refresh register 157 is previously loaded, however, from one of two start registers, described below, if a new location in the frame buffer 119 is to be displayed.

Each display period includes the display interval followed by a blank interval, where the display and blank intervals alternate during normal operation. The display interval terminates when the current frame is completed, at which time a blank interval is initiated to enable the display unit 122 to prepare for the next frame. The VBLANK* signal is asserted during the blank interval and negated during the display interval. During the blank interval, a signal VSYNC is asserted to synchronize initialize the display unit 122 for the next frame.

A memory controller 162 is coupled to the RIF bus 148 and the memory port 124 for arbitrating and controlling memory 118 access requests of the 2D/3D engine 146, the VGA core 150, the extended I/O block 152 and the display and video pipeline 154. The memory controller 162 preferably operates according to the RAMBUS™ standard and is capable of supplying burst data at up to 528 MB per second, and data transfers up to 256 bytes per request.

It is understood that the particular embodiment shown in FIG. 1 is only one of many possible implementations of a graphics system for use in a computer system. FIG. 1 is simplified for purposes of clarity and many control signals, logic blocks and circuitry not relevant to the present invention are not shown. In the preferred embodiment, the graphics processor 114 provides hardware support for 2D and 3D graphics, text and windowing operations of the computer system 100.

Figures 2, 3:
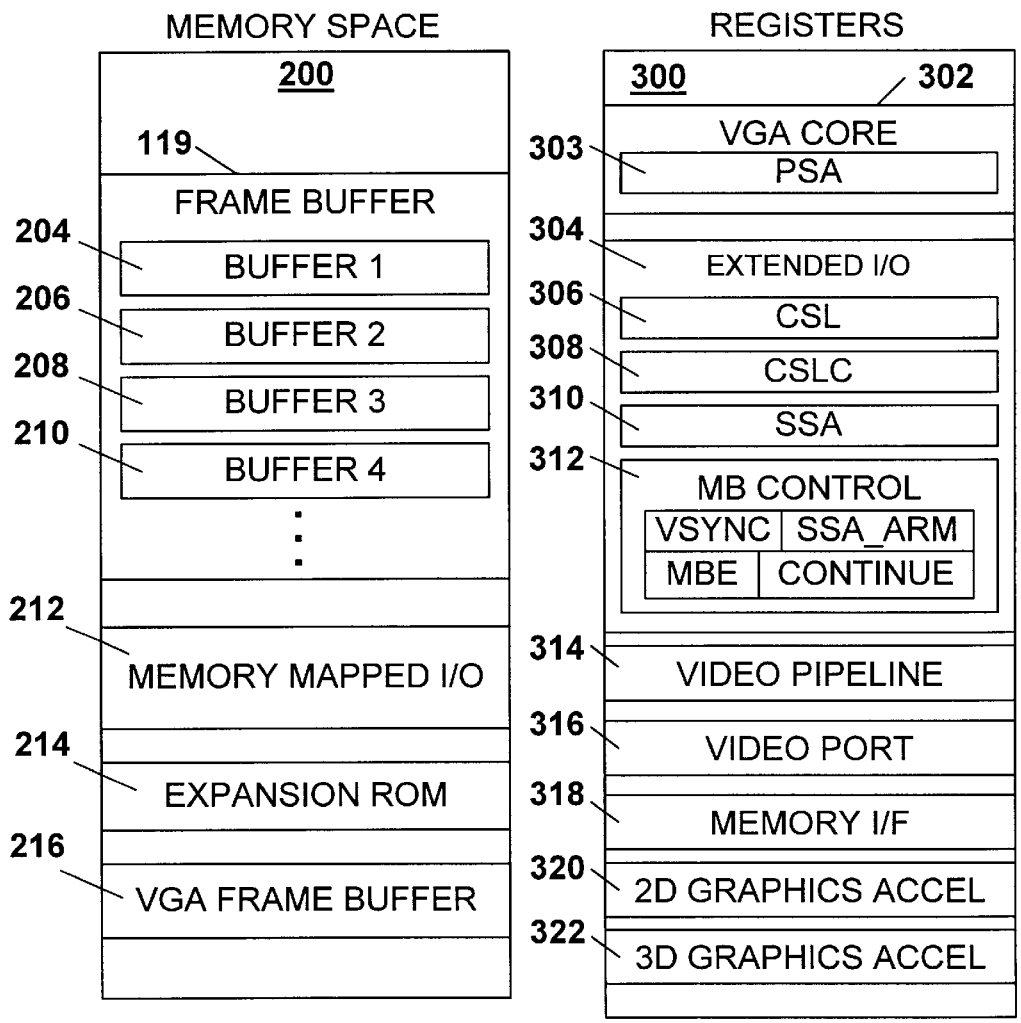
FIG. 2 is a simplified block diagram of the memory space of the graphics processor of FIG. 1.
FIG. 3 is a simplified diagram of a plurality of registers provided within the graphics processor of FIG. 1.

Referring now to FIG. 2, a simplified block diagram is shown of memory space 200 for addressing data in the memory 118 and registers within the graphics processor 114. The frame buffer 119 is addressed using up to four apertures 204, 206, 208 and 210, each having eight (8) MB of data, although any amount of memory could be used as desired. The graphics processor 114 is implemented to address as much display memory as desired. In the embodiment shown, the graphics processor 114 addresses one or more buffers within any one of the apertures 204–210 for displaying video on the display unit 122. Another buffer within the same or any other one of the apertures 204–210 may be used and accessed as a Z buffer for 3D purposes. As described more fully below, the same or any other of the remaining apertures is used to draw a subsequent frame and when a draw buffer is completed, it is used as a display buffer in a following display interval. The memory space 200 includes space for memory-mapped I/O 212 for providing access to most registers in the graphics processor 114. The memory mapped I/O 212 preferably includes four apertures of 4 Kilobytes (KB) each for a total of 32 KB. An expansion ROM section 214 is provided for copying the contents of the ROM 120 and for including expanded functionality. A VGA frame buffer 216 is also provided in the memory space 200 for compatibility with VGA, and is preferably includes approximately 128 KB.

Referring now to FIG. 3, a simplified diagram is shown of a plurality of registers 300 within the graphics processor 114. The registers include VGA core registers 302 primarily located in the VGA core 150 shown in FIG. 1. The VGA core registers 302 include a primary screen address (PSA) register 303 holding a screen start address. If multiple buffering according to the present invention is not enabled, the screen start address programmed into the PSA register 303 is loaded into screen display refresh register 157 in the CRTC 156 upon assertion of the VSYNC signal during a blank interval, where the contents of the display refresh register 157 is then loaded into display refresh counters (not shown). The screen start address points to the beginning location of a buffer or the frame buffer 119 that the CRTC 156 uses to draw the next frame on the display unit 122.

The registers 300 include a plurality of extended I/O registers 304 primarily located in the extended I/O block 152. A current scanline (CSL) register 306 is provided to read back the scanline currently being displayed on the display unit 122. A current scanline comparison (CSLC) register 308 holds a value that is compared to the value in the CSL register 306. If the values in the CSL 306 register and the CSCL 308 register are equal and if a signal CSLC_ARM is asserted by the 2D/3D engine 146, then a signal CSLC_EQ is asserted. The CSLC_ARM signal is asserted by the 2D/3D engine 146 when a WAIT_FOR_

SCANLINE command is executed by the 2D/3D engine 146. The WAIT_FOR_SCANLINE instruction is used to synchronize a drawing operation with the CRT refresh.

A secondary start address (SSA) register 310 is included to hold a secondary start address for purposes of swapping multiple buffers. When the SSA register 310 is written either by the CPU 104 or by a LOAD_LONG_HIF command in the display list mode by the graphics processor 114 and if multiple buffering is enabled, an SSA_ARM bit located in a multi-buffer control register 312 is set. The SSA register 310 and the multi-buffer control register 312 form a buffer switch memory used to synchronize switching buffers. The SSA_ARM bit arms the SSA register 310 for transfer into the display refresh register 157 at the next frame interval. Multiple buffering is enabled if a multi-buffer enable (MBE) bit in the multi-buffer control register 312 is set. If the SSA_ARM bit is set, the CRTC 156 loads the display refresh register 157 from the SSA register 310 during the following blank interval. In particular, the CRTC 156 reads the SSA register 310 at the assertion of the HSYNC signal while the VBLANK* and VSYNC signals are asserted. The VSYNC signal is used to reset the display unit 122 for the next frame for display. The SSA_ARM bit is cleared when the SSA register 310 is read by the CRTC 156. The SSA register 310 may be written almost any time, except when a guardband is activated, as described below, where the guardband is activated while the CRTC 156 is reading the SSA register 310. The guardband prevents an asynchronous race between reading and writing the SSA register 310. The multi-buffer control register 312 also includes a CONTINUE bit for synchronization between the CPU 104 and the graphics processor 114 as further described below.

The registers 300 also includes a plurality of video pipeline registers 314 located in the display and video pipeline 154, a plurality of video registers 316 located in the video port 130, a plurality of memory interface registers 318 located in the memory controller 162, and a plurality of 2D and 3D registers 320, 322 located in the 2D/3D engine 146.

Figure 4:
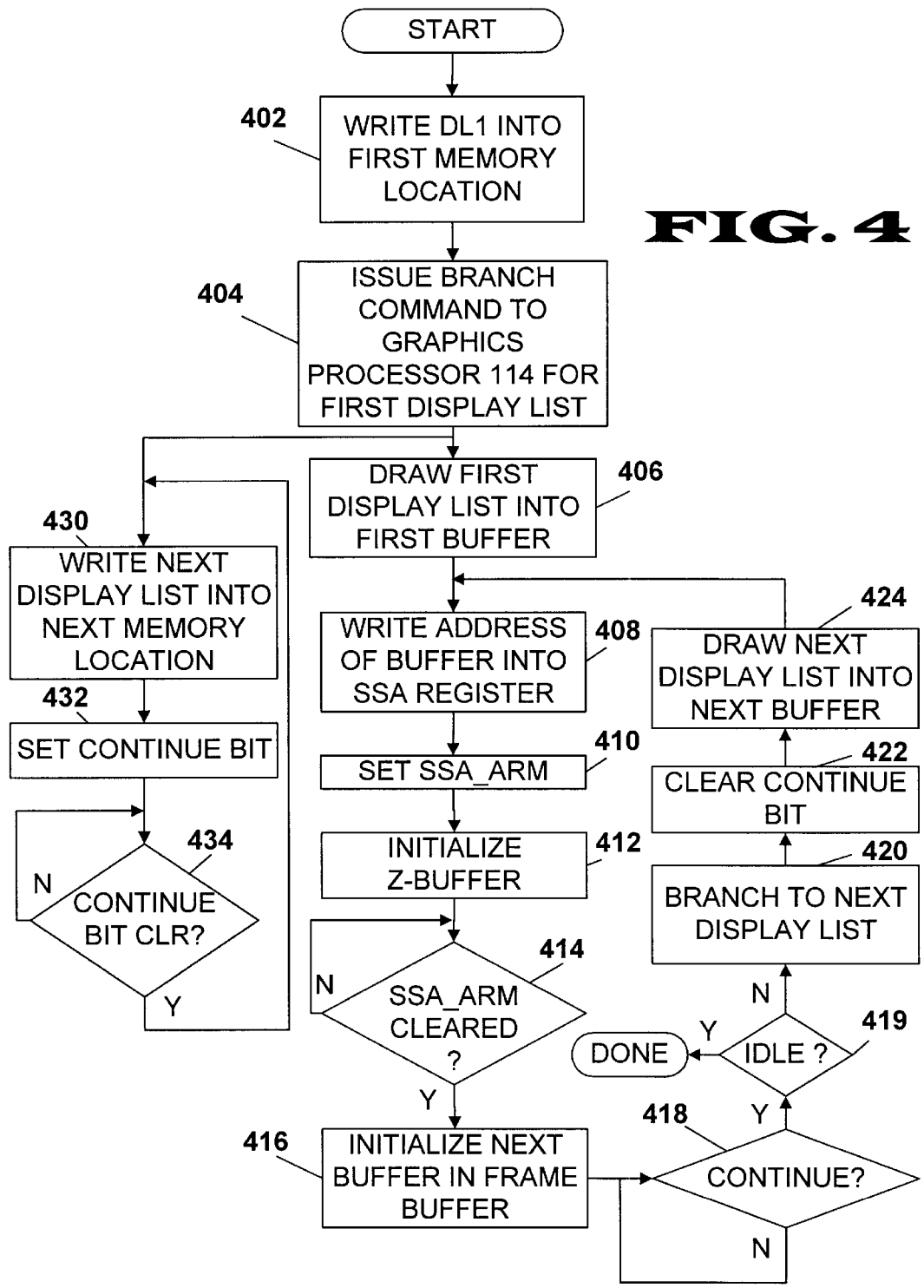
FIG. 4 is a flowchart diagram illustrating a method of synchronizing buffers according to the present invention using two buffers of a frame buffer.
Figure 5A:
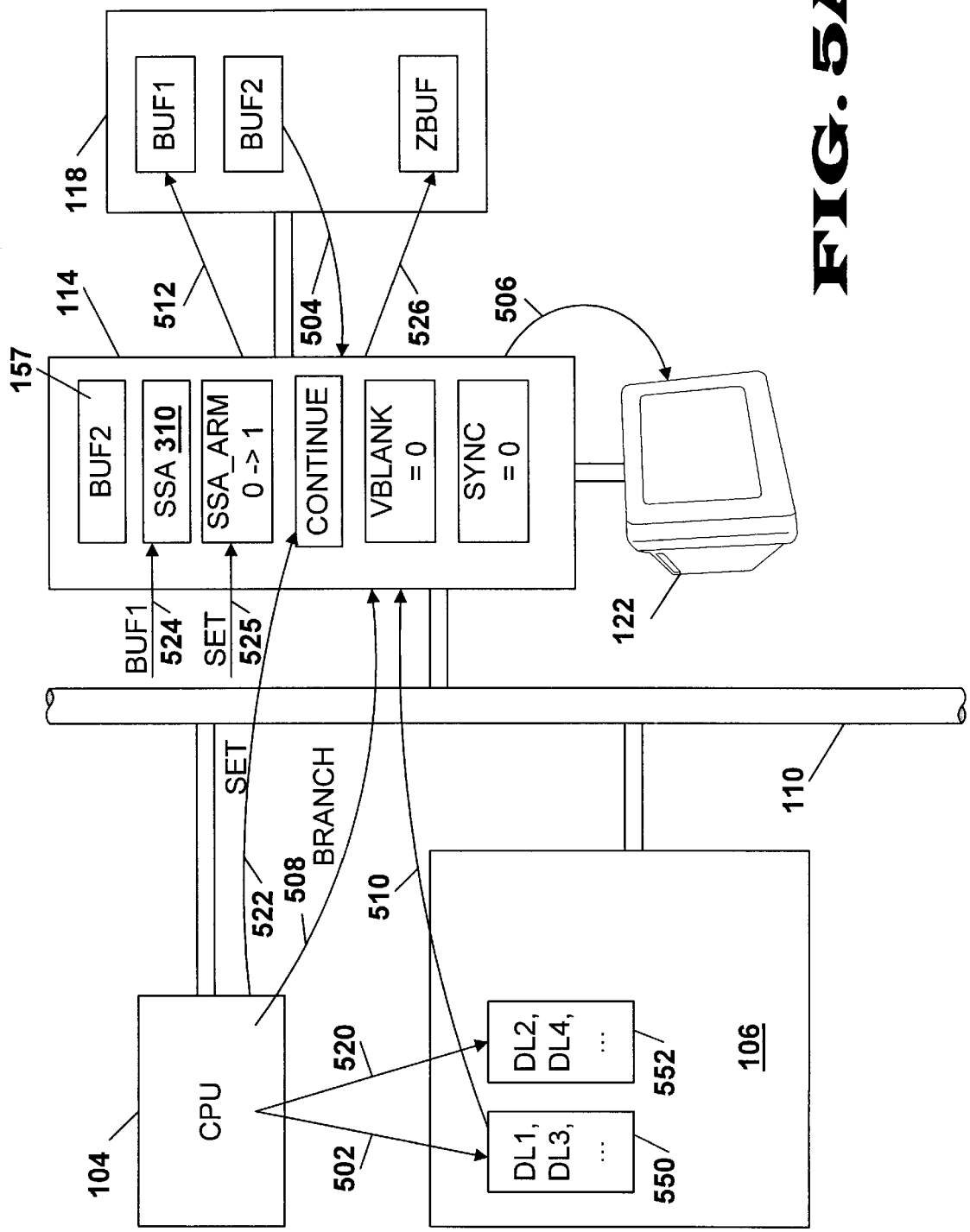
FIGS. 5A and 5B are simplified and figurative block diagrams of the computer system shown in FIG. 1 illustrating operation of synchronizing two buffers of a frame buffer according to the present invention.
Figure 5B:
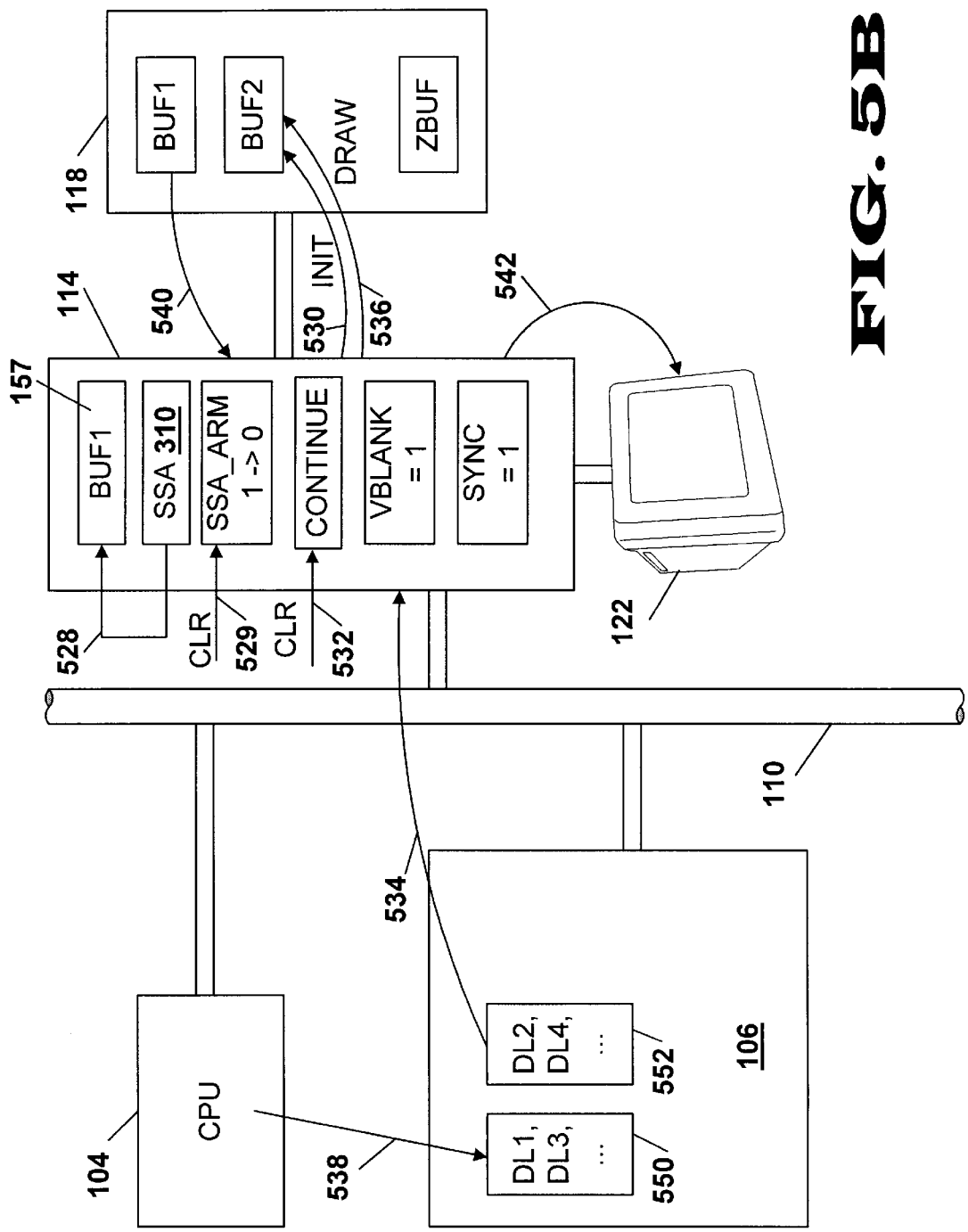

FIG. 4 is a flowchart diagram illustrating a method of synchronizing buffers according to the present invention using two buffers, referred to as BUF1 and BUF2, respectively, located in the frame buffer 119 of the memory 118. The MBE bit is set so that multiple buffering is enabled. The buffers BUF1, BUF2 are within any of the apertures 204–210. FIGS. 5A and 5B are simplified and figurative block diagrams of the computer system 100 to be referenced in conjunction with FIG. 4 to illustrate the steps. FIGS. 4, 5A and 5B illustrate the use of two locations 550, 552 in the system memory 106 for writing display lists. It is noted, however, that three or more such locations in the system memory 106 may also be used to further reduce wait states, if any, of the CPU 104. A signal SYNC is shown, which represents both the VSYNC and HSYNC signals asserted while VBLANK* is asserted. The SYNC signal is initially low. At a first step 402, the CPU 104 writes a first display list, referred to as DL1, into the first location 550 in the system memory 106. This is illustrated by an "action" arrow 502 in FIG. 5A. Meanwhile, the graphics processor 114 is displaying the contents of the buffer BUF2. Action arrow 504 in FIG. 5A shows the contents of BUF2 read by graphics processor 114 and action arrow 506 shows the converted video signals provided to the display unit 122. At this point, the display refresh register 157 holds the address of the beginning of the buffer BUF2 and thus "points" to the buffer BUF2 for purposes of displaying its contents.

After the CPU 104 finishes writing the first display list DL1, operation proceeds to step 404, where the CPU 104 issues a BRANCH command to the graphics processor 114 as indicated by action arrow 508. At next step 406, the graphics processor 114 transitions into the display list mode to access the display list DL1 from the system memory 106 and to draw or "render" the display list DL1 into the buffer BUF1. Action arrow 510 shows the graphics processor 114 accessing the display list DL1 in the system memory 106 via the peripheral bus 110 and action arrow 512 shows the graphics processor 114 rendering DL1 and writing the results into the buffer BUF1. Any one or more of the blocks within the graphics processor 114 are used for this purpose. For 3D images, the 2D/3D engine 146 is primarily involved.

The CPU 104 and the graphics processor 114 then proceed to concurrent and synchronized operations. The CPU 104 proceeds to step 430 to write a next display list, such as a second display list DL2, at the second memory location 552 in the system memory 106 as indicated by action arrow 520. After the CPU 104 completes the second display list DL2, it transitions to step 432 to set the CONTINUE bit in the multi-buffer control register 312 in the graphics processor 114 as indicated by action arrow 522. Then the CPU 104 proceeds to step 434 to poll the CONTINUE bit to wait for the graphics processor 114 to finish rendering the display list DL1 and writing to the buffer BUF1. In this case, the CPU 104 waits for the graphics processor 114 to finish with the memory location 550 before drawing the next or third display list DL3 into location 550. When the graphics processor 114 clears the CONTINUE bit as described below, the CPU 104 proceeds back to step 430 to write a next or third display list DL3 into the memory location 550, then to step 432 to set the CONTINUE bit and then to step 434 to query the CONTINUE bit. In this manner, the CPU 104 writes consecutive display lists DL1, DL2, DL3, DL4, DL5, etc. into alternate memory locations 550 and 552. The CPU 104 exits this loop at any time upon completion of a last display list for a given graphics operation.

Alternatively, as described more fully below, more than two memory locations are provided in the system memory 106, so that the CPU 104 need not poll a CONTINUE bit or wait for the graphics processor 114 to begin drawing the display list DL3. For example, a third memory location may be provided in the system memory 106, where the CPU 104 alternates between the three memory locations. Since the graphics processor 114 typically draws display lists faster than the CPU 104 writes them, however, two memory locations in the system memory 106 is usually sufficient. In any event, the CPU 104 does not write back into a previously written memory location in the memory 106 until the graphics processor 114 indicates that the CPU 104 may do so.

After the graphics processor 114 finishes the drawing commands in the display list DL1 to draw a frame into the buffer BUF1, it proceeds to step 408 to write the address of the beginning of the buffer BUF1 into the SSA register 310 as indicated by action arrow 524. A LOAD_LONG_HIF command is preferably provided as the next command in the display list DL1 itself to complete this step. Preferably, the graphics processor 114 automatically sets the SSA_ARM bit in the multi-buffer control register 312 as indicated at step 410 and action arrow 525 in response to writes to the SSA register 310 if the MBE is set, which prepares a transfer from the SSA register 310 to the display refresh register 157 during the next blank interval. If a third buffer in the frame buffer 119 is being used as a Z buffer (ZBUF), the graphics processor 114 proceeds to step 412 to clear and/or initialize the buffer ZBUF for 3D operations as indicated by action arrow 526. The graphics processor 114 then waits for the SSA_ARM bit to be cleared at next step 414. In this case, the next command in the display list DL1 after a command to initialize the buffer ZBUF, if any, is a WAIT_ON_!ARM command instructing the graphics processor 114 to continuously query the SSA_ARM bit until it is cleared before executing the next command in the display list DL1. At this point the CPU 104 is still writing the display list DL2 at step 430, or has set the CONTINUE bit at step 432 and is waiting for the CONTINUE bit to clear at step 434.

FIG. 5B illustrates operation while the VBLANK* signal is asserted during a blank interval. During assertion of the VBLANK* signal, the VSYNC and HSYNC signals are asserted (SYNC=1) to synchronize and reset the display unit 122. If the SSA_ARM bit is set, then the CRTC 156 loads the contents of the SSA register 310 into the display refresh register 157, as indicated by action arrow 528. Reading the SSA register 310 causes the graphics processor 114 to clear the SSA_ARM bit as indicated by action arrow 529. The display refresh register 157 thus points to the buffer BUF1 for the following display interval. The graphics processor 114 then proceeds to step 416 to initialize the next buffer, or buffer BUF2 at this point, as indicated by action arrow 530. At next step 418, the graphics processor 114 waits for the CONTINUE bit to be set by the CPU 104. A WAIT_ON_FLAG command is preferably included as the next command in the display list causing the graphics processor 114 to wait for the CONTINUE bit to be set. The CPU 104 eventually sets the CONTINUE bit in step 432 as indicated by action arrow 532.

After the CONTINUE bit is set, the graphics processor 114 encounters an IDLE instruction at next step 419, described below, if there are no more display lists to be rendered. If so, operation is completed. Otherwise, the graphics processor 114 branches to the next display list, such as display list DL2, as indicated at next step 420. Each display list preferably includes a BRANCH instruction as the last instruction if another display list is to be executed. The CPU 104 writes the address of the location of the next display list in the system memory 106 at any time prior to setting the CONTINUE bit since the graphics processor 114 waits in step 418. In this manner, the CPU 104 may modify the address of the next display list location in the system memory 106 in the current display list being executed by the graphics processor 114. At next step 422, the graphics processor 114 clears the CONTINUE bit as indicated by action arrow 532. The display list DL1 itself preferably includes a command to perform the operation of clearing the CONTINUE bit. Clearing the CONTINUE bit enables the CPU 104 to proceed back to step 430 as previously described, although CPU 104 may not have reached this point yet. After the graphics processor 114 clears the CONTINUE bit at step 422, the graphics processor 114 renders the next display list into the next buffer at next step 424. In the first pass of the flowchart, the next display list read by the graphics processor 114 at step 420 is DL2 as indicated by action arrow 534 and the next buffer to be drawn by the graphics processor 114 is the buffer BUF2 as indicated by action arrow 536. Upon completion of the next display list at step 424, the graphics processor 114 proceeds back to step 408 to begin drawing the next display list DL3 into the first memory location 550.

In this manner, the graphics processor 114 continuously loops through steps 408–424 until all display lists are rendered. It is noted that the CPU 104 causes the graphics processor 114 to continue this loop in display list mode by writing each display list with the appropriate commands. The CPU 104 terminates this loop by inserting an IDLE instruction in the final display list, such as, for example, replacing the final WAIT_ON_FLAG and BRANCH commands with an IDLE command in the last display list to be rendered as described for step 419. When the graphics processor 114 encounters an IDLE command, it transitions into idle mode and until the CPU 104 sends it another instruction, such as a BRANCH instruction.

After the display refresh register 157 is loaded with the address of the buffer BUF1 in the SSA register 310, the graphics processor 114 loads the BUF1 address of the display refresh register 157 into the screen display refresh address counters in the CRTC 156 as previously described. During the following display interval at the subsequent negation of the VBLANK* signal, the graphics processor 114 reads the data in the current display buffer BUF1 as indicated by action arrow 540, converts the data to appropriate video format and sends the video signals associated with the buffer BUF1 to the display unit 122 as indicated by the action arrow 542.

Figure 6:
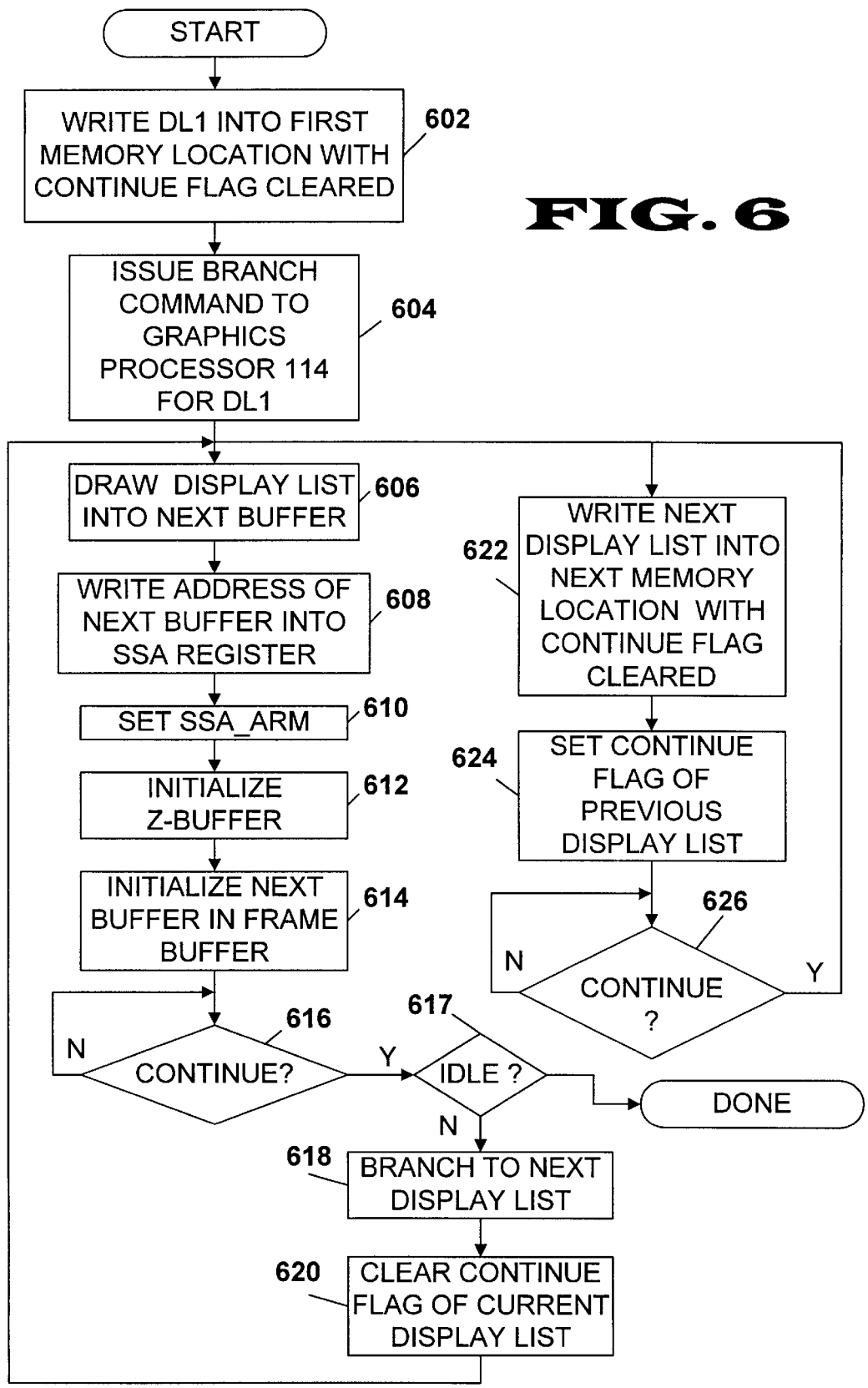
FIG. 6 is a flowchart diagram illustrating a method of synchronizing buffers according to the present invention using three or more buffers of a frame buffer.
Figure 7A:
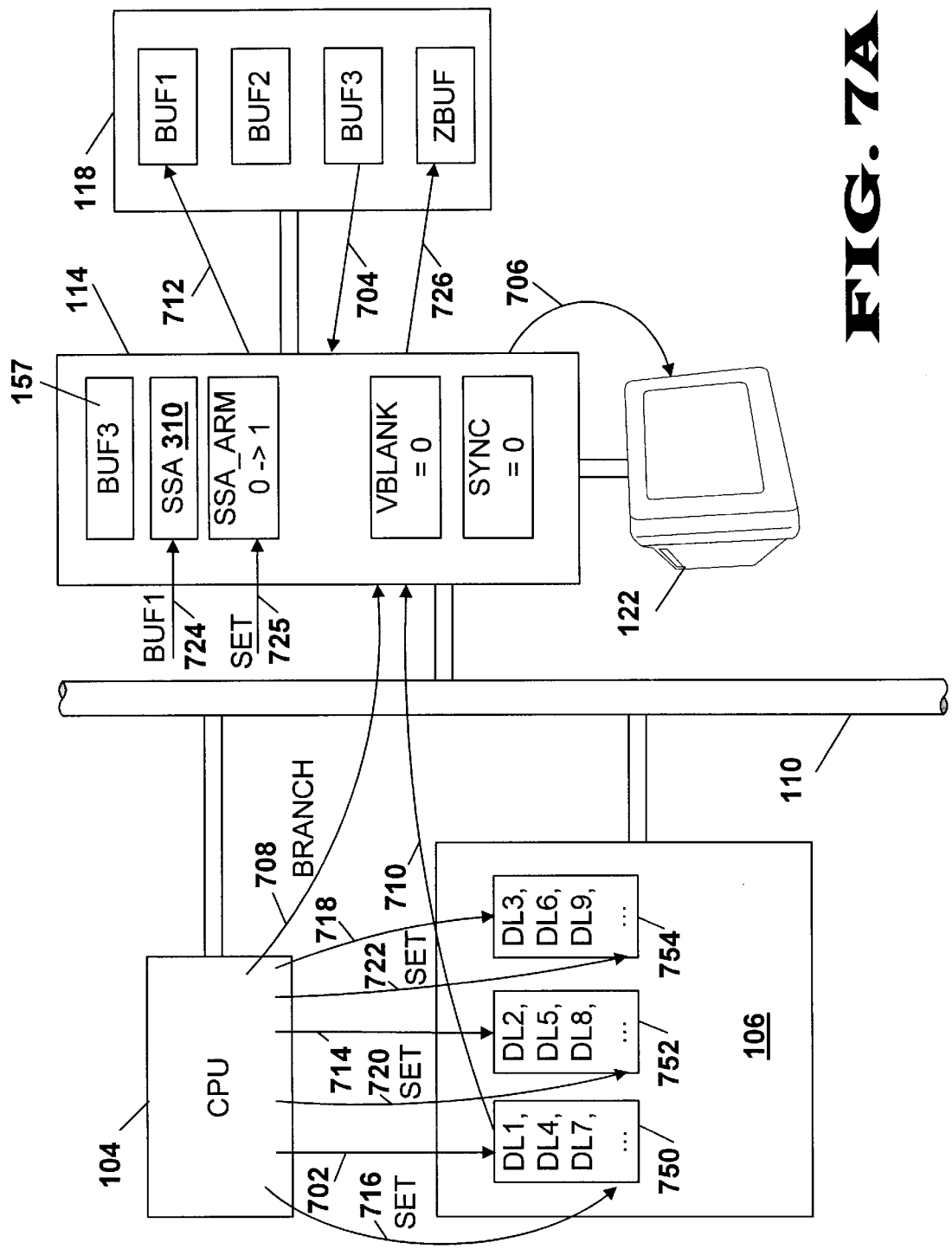
FIGS. 7A, 7B and 7C are simplified and figurative block diagrams of the computer system shown in FIG. 1 illustrating operation of synchronizing three buffers of a frame buffer according to the present invention.
Figure 7B:
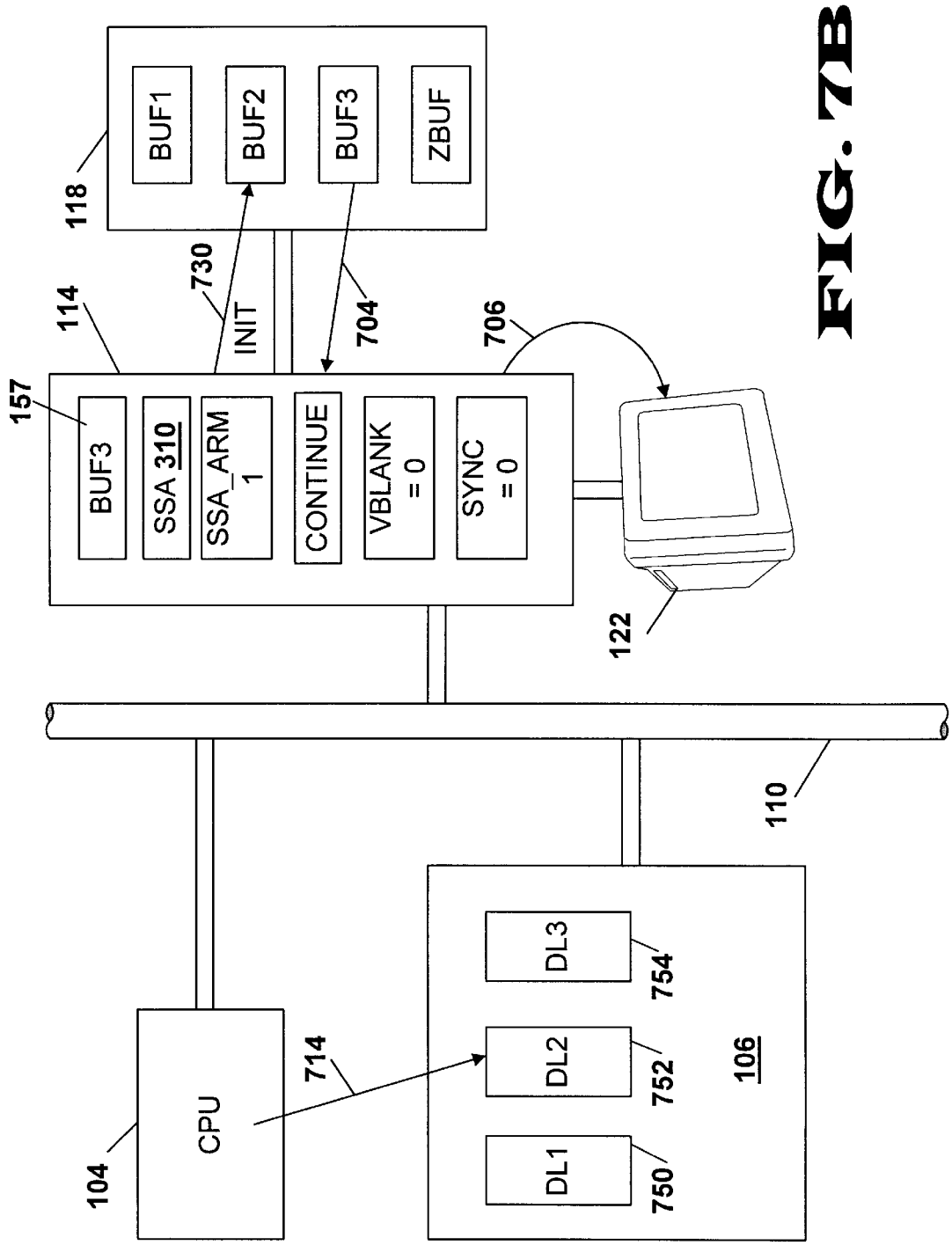
Figure 7C:
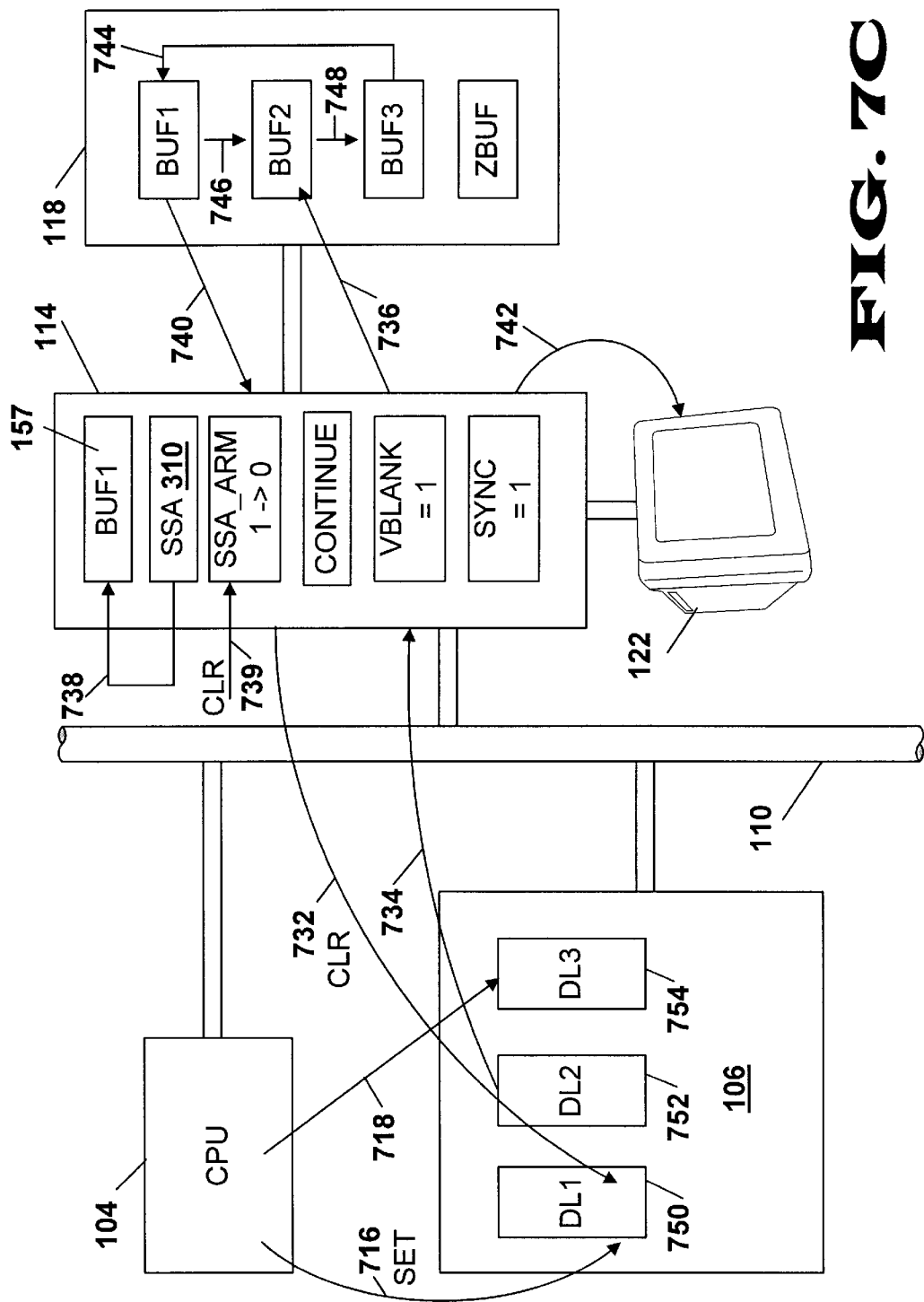

FIG. 6 is a flowchart diagram illustrating a method of synchronizing buffers according to the present invention using three or more frame buffers in the memory 118. FIGS. 7A, 7B and 7C are simplified and figurative block diagrams of the computer system 100 to be referenced in conjunction with FIG. 6 to illustrate the steps in a similar manner as the FIGS. 5A, 5B. Three buffers are illustrated, referred to as BUF1, BUF2 and BUF3, respectively, which are within any one or more of the apertures 204–210. A fourth buffer is used as the Z buffer ZBUF. It is noted that although three buffers are shown and described with reference to FIGS. 6 and 7A–7C, these Figures illustrate that the principles according to the present invention may be generalized to any number of buffers simply by including more buffers and switching between the included buffers. Multiple buffer synchronization according to the present invention is applied in the same manner.

FIGS. 6 and 7A–7C also illustrate the use of three locations 750, 752 and 754 in the system memory 106 for writing display lists. A single CONTINUE bit is not necessarily sufficient to synchronize between three or more locations in the system memory 106. A plurality of CONTINUE bits could be provided, but this would require that the graphics processor 114 include at least the correct number of CONTINUE bits to handle all possible configurations. Alternatively, a local CONTINUE flag is provided within each of the display lists themselves. Preferably, each display list includes a WAIT_ON_FLAG command or the like that includes a local CONTINUE flag as the condition for proceeding. The graphics processor 114 encounters the wait command and loops upon itself by continuously polling the local CONTINUE flag until set by the CPU 104. The CPU 104 eventually sets the local CONTINUE flag to enable the graphics processor 114 to continue. The graphics processor 114 then clears the local CONTINUE flag after branching to the next display list to indicate that the previous display list has been read and rendered into a buffer.

At a first step 602, the CPU 104 writes the first display list DL1 into the first location 750 in the system memory 106 as illustrated by action arrow 702. A local CONTINUE flag is written near the end of the display list DL1 and initialized or otherwise cleared by the CPU 104. Meanwhile, the graphics processor 114 displays the contents of the buffer BUF3 as indicated by actions arrows 704 and 706. The refresh display register 157 points to the buffer BUF3. The SSA_ARM bit is initially clear, and the VBLANK* and SYNC signals are not asserted. As before, the CPU 104 finishes writing the display list DL1 and issues a BRANCH command to the graphics processor 114 at step 604 and as indicated by action arrow 708. At next step 606, the graphics processor 114 transitions into the display list mode to access the display list DL1 106 as indicated by action arrow 710 and to draw DL1 into the buffer BUF1 as indicated by action arrow 712. Concurrently, the CPU 104 transitions to step 622 to write the next display list (DL2) into the second memory location 752 as indicated by action arrow 714. Again, the CPU 104 writes a cleared local CONTINUE flag at the end of the next display list DL2.

After the CPU 104 completes the next display list at step 622, it proceeds to step 624 to set the local CONTINUE flag of the previously written display list. In the first pass, the CPU 104 sets the local CONTINUE flag near the end of the display list DL1 as indicated by action arrow 716. The CPU 104 then proceeds to step 626 to determine whether to continue to write another display list into the next memory location. If only two memory locations were provided in the system memory 106, such as the memory locations 750 and 752, then the next memory location is location 750 and the CPU 104 polls the local CONTINUE flag of the display list DL1 at step 626 to determined if it has been cleared. If another memory location is provided, such as the location 754, then the CPU 104 determines whether it may write the next display list DL3 into the location 754. Since, in this case, the location has not been previously written, the CPU 104 immediately proceeds back to step 622 to write the next display list (DL3) into the memory location 754 as indicated by action arrow 718. Again, the display list DL3 is written with a cleared local CONTINUE flag near the end.

From step 622, operation again proceeds to step 624 to set the local CONTINUE flag near the end of the display list DL2 in the memory location 752 as indicated by action arrow 720. Again, the CPU 104 proceeds to next step 624 to determine whether another display list can be written in a next memory location. If another new memory location is provided, the CPU 104 proceeds immediately to the next new memory location and writes the next display list, which is the display list DL4. However, if the next memory location has previously been written, then the CPU 104 polls the local CONTINUE flag of the corresponding display list before writing a new display list over the previous display list. In the case shown in FIG. 7A, the next memory location is the memory location 750, so the CPU 104 polls the local CONTINUE flag at the end of the display list DL1 in step 626 until cleared by the graphics processor 114. After the local CONTINUE flag at the end of the display list DL1 in memory location 750 is cleared by the graphics processor 114, the CPU 104 proceeds back to step 622 to write the next display list DL4 into the memory location 750 (action arrow 702) having a cleared local CONTINUE flag near the end. After writing the display list DL4 into the memory location 750 at step 622, the CPU 104 proceeds to step 624 to set the local CONTINUE flag near the end of the last display list DL3 as indicated by action arrow 722.

After the memory locations 750–754 have been written once, the CPU 104 loops between steps 622–626 in this fashion and polls the local CONTINUE flag of the display list in the next memory location at step 626 before writing a new display list. In this manner, the CPU 104 writes consecutive display lists DL1, DL2, DL3, DL4, DL5, etc. Into alternate memory locations 750, 752 and 754. The CPU 104 may encounter less wait states with three memory locations in the system memory 106 as compared to only two memory locations. However, the graphics processor 114 usually renders faster than the CPU 104 writes, so three buffers may not be necessary. Of course, more than three or any number of memory locations may be used if desired. As before, the CPU 104 exits this loop at any time upon completion of a last display list for a given graphics operation. This embodiment using the local CONTINUE flag within the display lists works with two or more memory locations.

In a similar manner as described above, after the graphics processor 114 finishes drawing the next display list (DL1) into the buffer BUF1 at step 606, it proceeds to step 608 to write the address of the beginning of the next buffer (BUF1) into the SSA register 310 as indicated by action arrow 724. Again, a LOAD_LONG_HIF command is preferably provided as the next command in the display list (DL1) itself to complete this step. The SSA_ARM bit in the multi-buffer control register 312 is set as indicated at next step 610 and action arrow 725 to prepare a transfer from the SSA register 310 to the display refresh register 157 during the next assertion of the VBLANK* and SYNC signals. And, if a fourth buffer is being used as a Z buffer (ZBUF), the graphics processor 114 proceeds to next step 614 to clear and/or initialize the buffer ZBUF for 3D operations as indicated by action arrow 726.

In contrast to the two buffer case above, due to the triple buffer in the memory 118, the graphics processor 114 does not have to wait for the SSA_ARM bit to be cleared before drawing the next display list, although it waits for the CPU 104 to finish writing the next display list. FIG. 7B illustrates the case in which the graphics processor 114 has completed rendering the display list DL1 into the buffer BUF1 while the CPU 104 is writing and completing the display list DL2 into memory location 752 as indicated by action arrow 714. As shown in FIG. 7B, the graphics processor 114 proceeds to step 614 to initialize the next buffer (BUF2) for drawing as indicated by action arrow 730. The graphics processor 114 then proceeds to step 616 to wait for the local CONTINUE flag at the end of the display list DL1 to be set by the CPU 104. Action arrows 704 and 706 indicate that the buffer BUF3 is still being displayed in this case.

FIG. 7C illustrates the following blank and display intervals in which the graphics processor renders the display list DL2 into the buffer BUF2 and displays the rendered buffer BUF1. As shown in FIG. 7C, the CPU 104 has completed writing the next display list DL2 into the memory location 752, and sets the local CONTINUE flag at the end of the display list DL1 as indicated by the action arrow 716. The CPU 104 then proceeds to write the next display list (DL3) at memory location 754 as indicated by action arrow 718. In response to the local CONTINUE flag being set, the graphics processor 114 proceeds to next step 617 if an IDLE instruction is inserted in the display list. If so, there are no more display lists to be rendered and operation is complete. Otherwise, operation proceeds to next step 618 to branch to the next display list, which in the first pass is the display list DL2 written into the memory location 752. The graphics processor then clears the local CONTINUE flag of the previous or just rendered display list at next step 620 as indicated by action arrow 732. Operation then proceeds back to step 606 in which graphics processor 114 reads the next display list (DL2) as indicated by action arrow 734, and correspondingly renders that display list into the next buffer (BUF2) as indicated by action arrow 736. At the following assertion of the VBLANK* and VSYNC signals while the SSA_ARM bit is set, the address in the SSA register 310 is loaded into the display refresh register 157 by the CRTC 156 as illustrated by action arrow 738. The SSA_ARM bit is consequently cleared as shown by action arrow 739. The display refresh register 157 thus points to the buffer BUF1 for the following display interval.

During the following display interval beginning at the negation of VBLANK*, the graphics processor 114 retrieves the data from the buffer BUF1 as indicated by action arrow 740, converts the data into video signals and provides the video data to the display unit 122 as indicated by action arrow 742. An action arrow 744 indicates that the screen refresh operation switched from BUF3 to BUF1, and an action arrow 746 indicates that the drawing operation has switched from BUF1 to BUF2. Operation of the graphics processor 114 loops between steps 606–620, so that the buffers BUF1, BUF2 and BUF3 are rotated for both drawing and display. An action arrow 748 illustrates a following drawing operation switch from BUF2 to BUF3, where the corresponding display operation switches from BUF1 to BUF2. The CPU 104 and the graphics processor 114 each loop in this manner until all display lists for a given graphics operation are written, drawn and displayed. The IDLE instruction at step 617 terminates the loop when operation is completed.

Figure 8A:
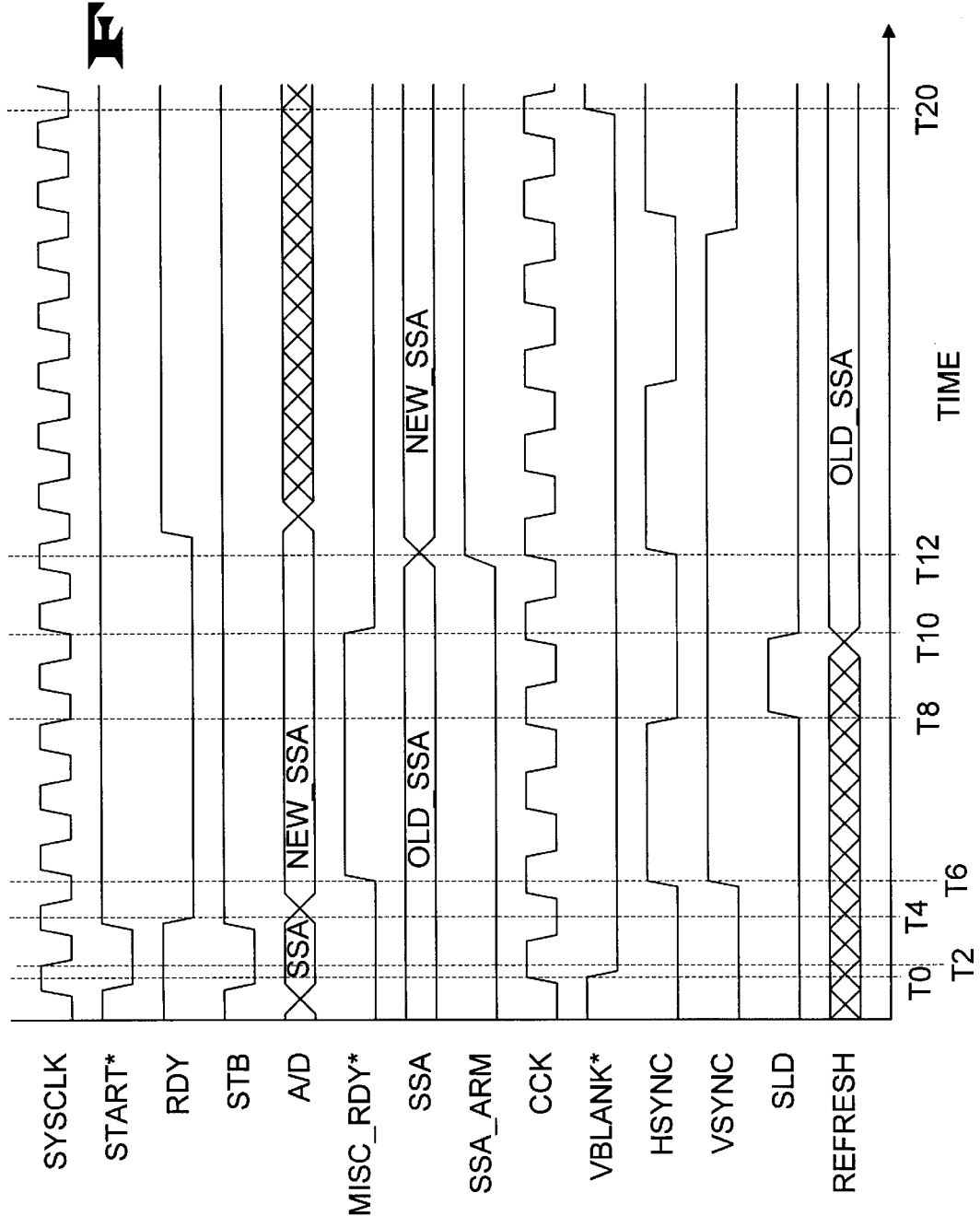
FIGS. 8A and 8B are two timing diagrams illustrating address reading and writing of an address register to synchronize multiple buffers according to the present invention, and implementation of a guardband to prevent an asynchronous race between reading and writing the same register.
Figure 8B:
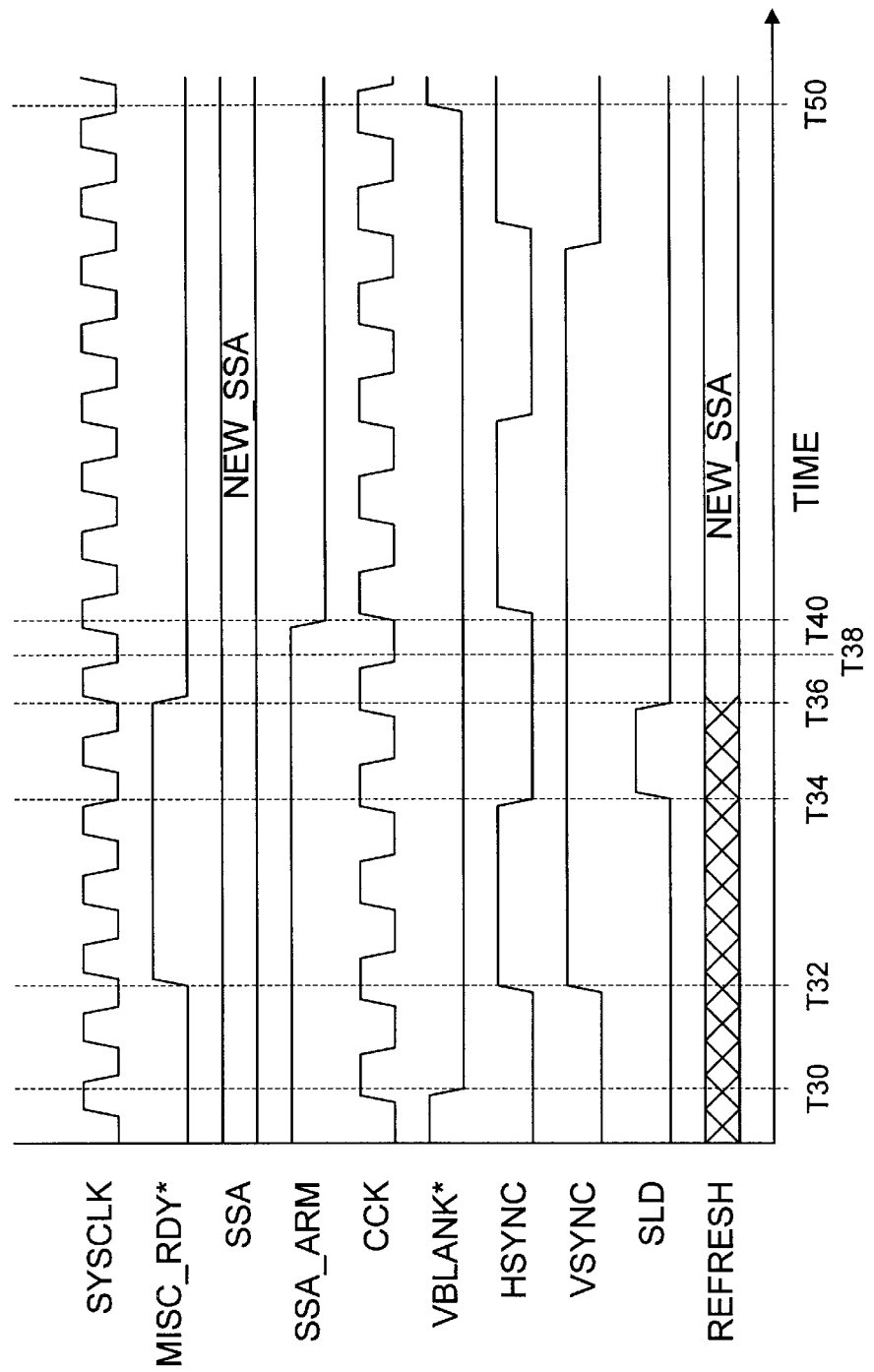

Referring now to FIGS. 8A and 8B, two timing diagrams are shown illustrating address reading and writing of the SSA register 310 to synchronize buffers according to the present invention. FIG. 8A also illustrates the guardband being activated while the CRTC 156 is reading the SSA register 310 during a blank interval. Since the display interval is significantly longer than the blank interval during each frame interval, the SSA register 310 is usually updated during the display interval. The SSA register 310 may be written with a new address, however, at any time. The CRTC 156 reads the SSA register 310 and sets (or arms) the SSA_ARM bit during the blank interval, preferably at the first occurrence of the VBLANK*, VSYNC and HSYNC signals all being asserted concurrently. It is possible that the graphics processor 114 would otherwise attempt to write a new address into the SSA register 310 while the CRTC 156 is reading it, resulting in an asynchronous race. This could potentially result in an erroneous address written to the SSA register 310 or the display refresh register 157 or a false value of the SSA_ARM bit. Thus, it is desirable to prevent writing to the SSA register 310 and setting the SSA_ARM bit until after the SSA register 310 is read by the CRTC 156.

The timing diagram shown in FIG. 8A includes two clock signal SYSCLK and CCK which operate at different frequencies and are generally not synchronized to each other. The SYSCLK signal is used for the various blocks within the graphics processor 114 for rendering purposes, such as the 2D/3D engine 146. The CCK is used by the refresh logic for display purposes. Several signals START*, RDY, STB and A/D are shown which are synchronous relative to the SYSCLK signal. Signals SSA denote the contents of the SSA register 310. A signal SSA_ARM shows the state of the SSA_ARM bit. The signals VBLANK*, HSYNC and VSYNC and a signal MISC_RDY* are synchronous with the CCK signal. A signal SLD is also synchronous with the CCK signal and is used for loading the display refresh register 157 from the SSA register 310. Signals REFRESH denote the contents of the display refresh register 157. Both timing diagrams in FIGS. 8A and 8B show the signals plotted versus time (TIME).

At an initial time T0, the START* signal is asserted indicating a write cycle to the SSA register 310 to write the address of a next buffer in the frame buffer 119, such as within any one of the apertures 204–210 as previously described. The SSA register 310 holds the "OLD_SSA" address from the previous display interval. The SSA_ARM bit is not set. At time T0, the signal STB is also asserted low to indicate an address phase, where an address "SSA" of the SSA register 310 is asserted on the A/D signals. Meanwhile, the VBLANK* signal is asserted low at a subsequent time T2 denoting the beginning of a blank interval. The STB signal is then asserted high and the RDY signal is asserted low at a subsequent time T4 and the new address of the next buffer, denoted as "NEW_SSA", is asserted on the A/D signals. In this manner, the graphics processor 114 has begun writing the new address value NEW_SSA into the SSA register 310. At a subsequent time T6, however, the HSYNC and VSYNC signals are asserted for the first time during the current blank interval, which initiates the CRTC 156 to read from the SSA register 310. The MISC_RDY* signal is also negated high approximately at time T6, which initiates the guardband. The guardband indicated by the MISC_RDY* signal effectively delays the write cycle of the SSA register 310 to prevent the write cycle from completing while the SSA register 310 is being read by the CRTC 156.

The HSYNC signal goes low and the SLD signal is asserted high approximately at a subsequent time T8. The SLD signal is asserted for one CCK cycle, and is negated at a subsequent time T10 to indicate the read cycle (relative to the SSA register 310) performed by the CRTC 156 from the SSA register 310 into the display refresh register 157. Since the write cycle to the SSA register 310 was stalled and has not yet completed at time T10, the OLD_SSA address in the SSA register 310 is again loaded into the display refresh register 157 at time T10 as indicated by the REFRESH signals. The MISC_RDY* is re-asserted at approximately time T10 to allow the write cycle to complete. The MISC_RDY* signal is thus re-asserted approximately one CCK cycle after the HSYNC signal is negated. At a subsequent time T12, the write cycle completes and the SSA register 310 is loaded with the NEW_SSA address and the SSA_ARM bit is set. Since the write cycle to write the NEW_SSA address completed after the SSA register 310 was read by the CRTC 156, the OLD_SSA value is used in the following display interval.

FIG. 8B illustrates the following blank interval to illustrate loading of the NEW_SSA address into the display refresh register 157. The SSA register 310 includes the NEW_SSA address loaded from the previous blank interval and the SSA_ARM bit is set, as described above with reference to FIG. 8A. The next blank interval is initiated at a time T30 when the VBLANK* signal is negated low. The HSYNC and VSYNC signals are asserted and the MISC_RDY* signal is negated at a subsequent time T32 initiating the read cycle of the SSA register 310 by the CRTC 156 to write its contents into the display refresh register 157. At subsequent time T34, the HSYNC signal is negated and the SLD signal is asserted for one CCK cycle as described previously. The SLD signal goes low and the MISC_RDY* signal is re-asserted high at a subsequent time T36, and the NEW_SSA value in the SSA register 310 is loaded into the display refresh register 157 as indicated by the REFRESH signals. The SSA_ARM bit is subsequently cleared at time T40 with the next rising edge of the SYSCLK signal. The blank interval ends and the following display interval begins at subsequent time T50 when the VBLANK* signal is negated. The NEW_SSA value is used to point to the rendered buffer to be displayed.

It is now appreciated that a system and method of synchronizing multiple buffers for display according to the present invention provides a more efficient means of cooperation between a CPU and a graphics processor. The CPU sets a flag or bit after completion of a new display instruction set at a new memory location, and then queries the flag before overwriting a previously written display instruction set. When rendering of an instruction set in a draw buffer is completed, the graphics processor clears the flag, writes the address of the draw buffer and arms for buffer transfer. This enables the CPU to write another instruction set into a previously used memory location. The graphics processor switches draw and display buffers between at the next blank interval automatically without intervention by the CPU.

Since the graphics processor typically renders instruction sets faster than the CPU writes them, the CPU rarely waits for the graphics processor. Also, there is no need for the CPU to poll registers for determination of display status. Instead, the CPU continues to write instruction sets. Such synchronization between the CPU and the graphics processor allows more instruction sets to be written, rendered and displayed in a given amount of time, which ultimately provides for better performance of the graphic system for improved 3D animation.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method of synchronizing a plurality of buffers of a graphics system for rendering and displaying from a plurality of display lists, each displayed during at least one display interval of a plurality of sequential frame intervals, each frame interval including a display interval followed by a blank interval, the method comprising steps of:

reading an address and clearing an arm flag during each blank interval;

displaying a buffer corresponding to the address during the following display interval;

alternately writing consecutive display lists into at least two memory locations in a system memory;

waiting for a continue indication for a written display list to be cleared before overwriting that display list during said writing consecutive display lists step;

providing a continue indication after each display list is written;

selecting a next buffer other than the buffer being displayed for rendering a next display list;

after a continue indication is provided, retrieving and rendering a next written display list into the selected buffer;

clearing a continue indication after a display list has been rendered;

writing an address corresponding to the rendered display list for display;

setting the arm flag and wait for arm flag to be cleared;

clearing the arm flag; and repeating said selecting, retrieving, rendering, clearing and writing an address steps for each of the plurality of display lists.

2. The method of claim 1, after said step of setting the arm flag, further comprising a step of:

initializing a Z buffer for 3D rendering and displaying.

3. The method of claim 1, after said step of clearing the arm flag, further comprising a step of:

initializing the next buffer for rendering the next display list.

4. A graphics system for a computer system including a system memory with two memory locations for storing consecutive display lists, the graphics system comprising:

a frame buffer including a plurality of buffers; and a graphics processor coupled to said frame buffer and for coupling to the system memory, comprising:

a buffer switch memory that stores an address, an arm bit and a continue bit;

display logic that reads said address from said buffer switch memory and that uses said address to retrieve rendered data for display from one of said plurality of buffers; and rendering logic that retrieves a next display list from the system memory after said continue bit is set, that renders said retrieved display list into another one of said plurality of buffers, that writes an address corresponding to said another one of said plurality of buffers into said buffer switch memory, that clears said continue bit after rendering said retrieved display list, set said arm bit, waiting until said arm bit is cleared, and that sequences through said plurality of buffers to render a plurality of display lists.

5. The graphics system of claim 4, further comprising:

said rendering logic including a host interface that retrieves display lists from the system memory and a 3D engine that renders retrieved display lists.

6. The graphics system of claim 4, further comprising:

said buffer switch memory including a start register for storing said address; and said display logic including a refresh register, wherein said display logic copies said address in said start register to said refresh register.

7. A computer system for rendering and displaying a plurality of display lists, comprising:

a display device;

a frame buffer including a plurality of buffers;

a system memory;

a graphics processor coupled to said frame buffer, said display device and said system memory, said graphics processor comprising:

a buffer switch memory that stores an address and an arm bit;

display logic that reads said address from said buffer switch memory and that uses said address to retrieve rendered data for display from one of said plurality of buffers; and rendering logic that retrieves a next display list from said system memory after a continue indication is provided for said next display list, that renders said retrieved display list into another one of said plurality of buffers, that writes an address corresponding to said another one of said plurality of buffers into said buffer switch memory, that clears said continue indication after rendering said retrieved display list, set said arm bit, waiting until said arm bit is cleared, and that sequences through said plurality of buffers to render the plurality of display lists; and a central processor that writes display lists into said system memory and that provides a corresponding continue indication after writing each display list.

* * * * *